United States Patent [19]

Storace

[11] 4,050,530
[45] Sept. 27, 1977

[54] METHOD AND APPARATUS FOR DETERMINING WEIGHT AND MASS

[75] Inventor: Anthony Storace, Tarrytown, N.Y.

[73] Assignee: Pitney-Bowes, Inc., Stamford, Conn.

[21] Appl. No.: 686,475

[22] Filed: May 14, 1976

[51] Int. Cl.² .................. G01G 3/14; G01N 29/00
[52] U.S. Cl. ............................ 177/1; 177/210 FP; 73/67.2
[58] Field of Search ............. 177/1, 210 R, 210 FP; 73/67.2

[56] References Cited

U.S. PATENT DOCUMENTS

| 2,305,783 | 12/1942 | Heymann et al. | 177/1 X |
|---|---|---|---|
| 3,374,844 | 3/1968 | Rogers | 177/210 FP |
| 3,595,329 | 7/1971 | Withnell | 73/67.2 X |
| 3,926,271 | 12/1975 | Patashnick | 177/210 FP |
| 3,967,497 | 7/1976 | Brown | 177/210 FP X |

FOREIGN PATENT DOCUMENTS 488,921  10/1937  United Kingdom ......... 177/210 FP

Primary Examiner—George H. Miller, Jr.
Attorney, Agent, or Firm—Robert S. Salzman; William D. Soltow, Jr.; Albert W. Scribner

[57] ABSTRACT

A method and an apparatus is disclosed for measuring weighing and/or mass of an object. The object to be measured is subjected to an input frequency signal supplied to a piezoelectric crystal. Another piezoelectric crystal supporting the object is caused to vibrate in response to the input frequency signal and the mass and/or weight of the supported object. This second vibrating piezoelectric crystal will then produce a frequency output signal, whose amplitude is a function of the mass (and/or weight) of the object being measured. The frequency of the input and the output signals are substantially the same.

22 Claims, 3 Drawing Figures

METHOD AND APPARATUS FOR DETERMINING WEIGHT AND MASS

This invention pertains to weight and/or mass measuring, and more particularly to a novel method and apparatus for determining the weight and/or mass of an object.

BACKGROUND OF THE INVENTION

Heretofore many vibratory methods have been devised to measure the weight and/or mass of an object. Many of the prior vibratory schemes rely upon the object to cause a change in frequency of an introduced signal, or upon measuring a change in the natural frequency of the system when the object is added into it. Some of these prior systems can be seen with reference to the following U.S. Pat. Nos.: G. BRADFIELD Pat. No. 3,332,506 Issued: July 25, 1967; H. PATASHNICK Pat. No. 3,926,271 Issued: Dec. 16, 1975; J. L. CHRISTMANN Pat. No. 3,566,678 Issued: Mar. 2, 1971; J. W. FOGWELL Pat. No. 3,572,098 Issued: Mar. 23, 1971; A. WIRTH et al Pat. No. 3,621,713 Issued: Nov. 23, 1971; M. GALLO Pat. No. 3,612,198 Issued: Oct. 12, 1971; and J. L. CHRISTMANN Pat. No. 3,608,359 Issued: Sept. 28, 1971 W. E. THORTON Pat. No. 3,555,886 Issued: Jan. 19, 1971.

The present invention does not rely upon a change in frequency of the system to determine the weight of an object. Rather, the invention contemplates obtaining an output signal, whose frequency is essentially the same as the input signal frequency. The invention measures a change in amplitude of the output signal, the amplitude being a function of the mass. The inventive system uses a piezoelectric crystal to excite the mass into vibrating. Another piezoelectric crystal is used as a detector of the force necessary to accelerate and decelerate (vibrate) the mass. The force necessary to vibrate the mass is proportional to the output voltage of the crystal. A mass determination can be made by knowing the average acceleration and the force ($F = ma$).

SUMMARY OF THE INVENTION

This invention relates to a method and apparatus for determining the weight and/or mass of an object. The object is supported upon a platform or pan. The object and the pan is in turn supported by a first piezoelectric crystal means. This crystal means, the pan, and the object receive a vibratory signal from a second piezoelectric crystal means, that is in vibratory contact with them. The second piezoelectric crystal means is caused to produce a vibratory signal in response to a voltage impressed thereon. The first and second crystal means each vibrate at essentially the same frequency, but the voltage output or amplitude of the signal from the first crystal means is a function of the mass, and/or the supported weight. If the pan and first crystal means are vibrated without the object, a reference signal is obtained. This reference signal can be subtracted from the total output signal to determine the mass and/or weight of the object.

The oscillating output voltage is rectified to provide an average voltage reading.

The present invention provides many advantages over the prior art. The apparatus does not need to rely on resonant frequencies (although resonant frequencies can be employed). This allows for a greater versatility in operating energies, voltages, and frequencies. Because a piezoelectric crystal(s) is used as the excitation means, the apparatus can vibrate at a high frequency, thus appearing to be motionless. In addition, the crystals and pan can be made very flat, giving rise to a very compact structure. This method and apparatus can supply the accurate mass of an object, regardless of changes in the gravitational constant ($g$).

It is an object of the invention to provide an improved method and apparatus for determining the weight and/or mass of an object;

It is another object of this invention to provide a weight and/or mass determination for an object by means of vibrationally exciting a piezoelectric crystal(s) and measuring its voltage output or amplitude of its signal as a function of the mass or weight being supported;

It is a further object of the invention to provide a compact, versatile, and accurate apparatus for determining the weight and/or mass of an object.

These and other objects of this invention will be better understood and will become more apparent with reference to the following detailed description taken in conjunction with the attached drawing, in which.

DETAILED DESCRIPTION

Figure 1:
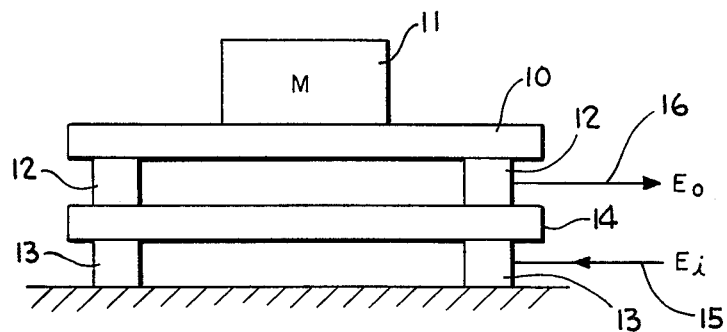
FIG. 1 is a front view of the weight and/or mass determining apparatus of the invention.

Now referring to FIG. 1, a pan or platform 10 is shown supporting an object 10 having a mass "M" to be measured.

At least one piezoelectric crystal 12 (two shown) supports, or otherwise is in vibrational contact with the pan 12.

At least one piezoelectric crystal 13 (two shown) supports or otherwise is in vibrational contact with piezoelectric crystals 12. An electrically isolating member 14 may be provided between the two types of crystals 12 and 13.

An excitation voltage "$E_i$" is impressed (arrow 15) upon crystal 13, causing it to vibrate at a given frequency.

Because crystal 12 is in vibratory contact with crystal 13, crystal 12 will likewise be caused to vibrate. Additionally, pan 10 and mass 11 will be caused to vibrate, since they are also in vibratory contact with crystals 12 and 13.

Crystal 12 will vibrate at a frequency essentially the same as crystal 13.

Crystal 12 will produce an output voltage "$E_o$" (arrow 16) in response to the frequency signal being imparted to its by crystal 12. However, the amplitude of the output voltage "$E_o$" will vary in response to the weight (mass) being supported by crystal 12. When no object 11 is resting on platform 11, the output voltage "$E_o$" will only be a function of the "tare" or platform weight (mass).

OPERATION OF THE INVENTION

When an object 11 to be measured is placed upon the pan 10, and an input voltage "$E_i$" is impressed upon crystal 13, an output voltage signal "$E_o$" will be produced by crystal 12. The output voltage "$E_o$" will have an amplitude which is proportional to the force necessary to accelerate and decelerate the supported weight or mass, in accordance with the Newtonian formula:

$$F = ma$$

where:
"F" is the average force "m" is the mass of the supported weight; and "a" is the average acceleration and deceleration (vibration) of the mass "m".

For a sinusoidal impressed voltage on crystal (13) $E_i$ the mass acceleration will be $$E_i = xw^2 \text{ (in/sec}^2\text{)}$$

where:
$x$ = amplitude of vibration (inches) (a function of $E_i$)
$w$ = frequency of $E_i$ (radians)/sec (a constant frequency)

If the acceleration "a" is known, then the mass "m" can be determined from: $F = mE_i$ Therefore for crystal 12

$$E_m = KF = Kmxw^2$$
$$m = (Em/kxw)$$

where:
"$E_m$" is the average "E" output voltage. and K is a constant value for crystal 12.

Figure 2:
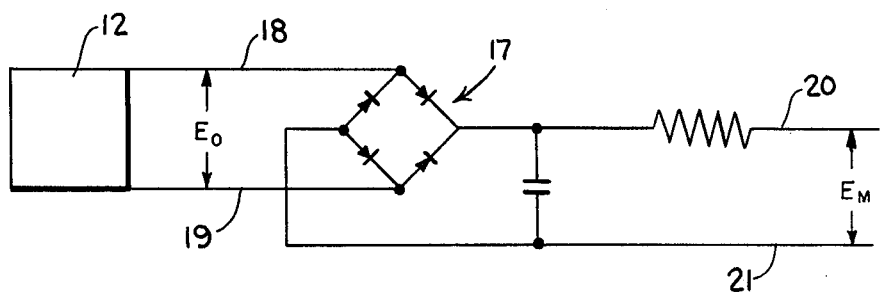
FIG. 2 is a typical circuit for rectifying the output voltage obtained from the apparatus of FIG. 1.

The average output voltage $E_m$ is obtained by rectifying the output voltage $E_o$. This rectification can be accomplished by using a circuit such as is shown in FIG. 2.

The crystal 12 produces an output voltage $E_o$ as illustrated. A full wave bridge rectifier 17 receives the "$E_o$" signal on lines 18 and 19, and produces the average "$E_m$" signal over lines 20 and 21.

Figure 3:
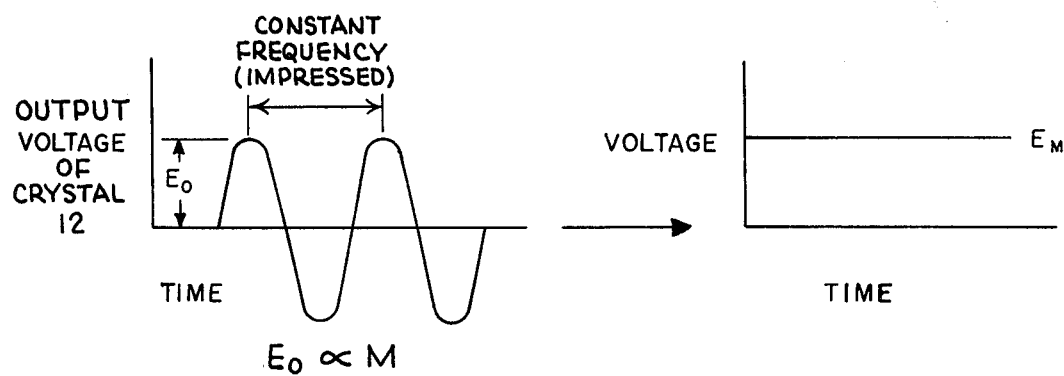
FIG. 3 is a schematic diagram of the output voltage signal before and after rectification.

FIG. 3 depicts the diagrammatic shapes for the signals "$E_o$" and "$E_m$", respectively.

Weight may be determined from the value of the mass by the formula:

$$W = mg$$

where:
W is weight;
m is mass;
g is the gravitational constant.

In order to eliminate the tare weight, a reference output voltage is first obtained with no weight (mass) 11 being supported on pan 10. This reference voltage is subtracted from the subsequent readings, or the readout instrumentation (not shown) is zeroed at this reference voltage level. In any event, this reference voltage is subracted from the final weight readings.

Having described the invention, it is deemed that all obvious improvements be considered as falling within those limits defining the full scope and spirit of the invention. For example, means may be devised to preventing inaccuracies due to temperature effects or changes in frequency of the crystals. The input voltage may have to be carefully regulated to prevent drift in the output frequency signal, etc.

The invention should be interpreted and defined with reference to the appended claims.

What is claimed is:

1. A weighing apparatus, comprising:
   a weighing support for receiving a mass to be weighed;
   a first piezoelectric crystal means supporting the weighing support with said mass and receiving a vibrational input, said first piezoelectric crystal means providing an output voltage in response to said vibrational input, said output voltage being proportional to the mass to be weighed;
   a second piezoelectric crystal means in vibratory contact with said first piezoelectric crystal means, said weighing support and said mass, said second piezoelectric crystal means receiving an input voltage and providing a vibrational output in response to said vibrational output being inputted to said first piezoelectric crystal means, said weighing support and said mass; and
   indicating means for indicating the weight of said mass in response to receipt of said output voltage.

2. The weighing apparatus of claim 1, further comprising rectifying means electrically connected to said first piezoelectric crystal means for receiving said output voltage and providing a rectified voltage.

3. A mass measuring apparatus comprising:
   a support means for receiving a mass to be measured;
   a first piezoelectric crystal means supporting the support means with said mass and receiving a vibrational input, said first piezoelectric crystal means providing an output voltage in response to said vibrational input, said output voltage being proportional to the mass to be measured;
   a second piezoelectric crystal means in vibratory contact with said first piezoelectric crystal means, said support means and said mass, said second piezoelectric crystal means receiving an input voltage and providing a vibrational output in response to said voltage input, said vibrational output being inputted to said first piezoelectric crystal means, said support means and said mass; and
   indicating means for indicating the mass of said mass in response to receipt of said output voltage.

4. The mass measuring apparatus of claim 3, further comprising rectifying means electrically connected to said first piezoelectric crystal means for receiving said output voltage and providing a rectified voltage.

5. A method of weighing a mass, comprising the steps of:
   A. supporting a mass to be weighed upon a first piezoelectric crystal means;
   B. supporting said first piezoelectric crystal means upon a second piezoelectric crystal means;
   C. causing said second piezoelectric crystal means to vibrate by applying an input voltage thereto, said first piezoelectric crystal means also being caused to vibrate at a frequency substantially corresponding to that of the second piezoelectric crystal means, said first piezoelectric crystal means providing an output voltage when it is caused to vibrate; and
   D. measuring the output voltage of the first piezoelectric crystal means in order to determine the weight of the mass being supported by the first piezoelectric crystal means.

6. The method of weighing the mass of claim 5, further comprising the steps of:
   E. rectifying the output voltage of the first piezoelectric crystal means.

7. The method of weighing the mass of claim 5, further comprising the steps of:
   E. vibrating the first piezoelectric crystal means without the mass being supported thereby;

F. measuring the output voltage of said first piezoelectric crystal means when the first piezoelectric crystal means is not supporting the mass, in order to determine a reference weight voltage and G. subtracting the reference weight voltage from the output voltage obtained in step (D).

8. A method of measuring a mass, comprising the steps of:
A. supporting a mass to be measured upon a first piezoelectric crystal means;
B. supporting said first piezoelectric crystal means upon a second piezoelectric crystal means;
C. causing said second piezoelectric crystal means to vibrate by applying an input voltage thereto, said first piezoelectric crystal means also being caused to vibrate at a frequency corresponding to that of the second piezoelectric crystal means, said first piezoelectric crystal means providing an output voltage when it is caused to vibrate; and
D. measuring the output voltage of the first piezoelectric crystal means in order to determine the mass being supported by the first piezoelectric crystal means.

9. The method of measuring the mass of claim 8, further comprising the step of:
E. rectifying the output voltage of the first piezoelectric crystal means.

10. The method of measuring the mass of claim 8, further comprising the steps of:
E. vibrating the first piezoelectric crystal means without the mass being supported thereby;
F. measuring the output voltage of said first piezoelectric crystal means when the first piezoelectric crystal means is not supporting the mass, in order to determine a reference mass voltage; and
G. subtracting the reference mass voltage from the output voltage obtained in step (D).

11. A method of weighing a mass, comprising the steps of:
A. supporting a mass to be weighed upon a weighing support means;
B. introducing a frequency input signal to said mass and said weighing support means;
c. producing an output frequency signal having an amplitude that is a function of the weight of said mass; and
D. measuring the amplitude of said output frequency signal to determine the weight of said mass.

12. The method of claim 11, wherein the frequency of the output signal is substantially the same as the input signal.

13. The method of claim 11, further comprising the step of:
E. rectifying the output signal.

14. The method of claim 11, further comprising the steps of:
E. introducing a frequency input signal to said weighing support means without the mass being supported thereby, to produce a reference output signal;
F. producing said reference output signal; and
G. subtracting the reference output signal from the output signal produced in step (C).

15. A method of measuring a mass, comprising the steps of:
A. supporting a mass to be measured upon a mass support means;
B. introducing a frequency input signal to said mass and said mass support means;
C. producing an output frequency signal having an amplitude that is a function of said mass; and
D. measuring the amplitude of said output frequency signal to determine said mass.

16. the method of claim 15, wherein the frequency of the output signal is substantially the same as the input signal.

17. The method of claim 15, further comprising the step of:
E. rectifying the output signal.

18. The method of claim 15, further comprising the steps of:
E. introducing a frequency input signal to said mass support means without the mass being supported thereby, to produce a reference output signal;
F. producing said reference output signal; and
G. subtracting the reference output signal from the output signal produced in step (C).

19. A weight measuring apparatus, comprising:
support means for supporting a mass to be weighed;
input frequency means for introducing a frequency input signal to said mass and said support means;
output frequency means operatively connected to said support means for producing an output frequency signal having an amplitude that is a function of the weight of said mass; and
measuring means operatively connected to said output frequency means for measuring said amplitude of said output frequency signal.

20. The weight measuring apparatus of claim 19, further comprising:
rectifying means electrically connected to said measuring means for rectifying said output frequency signal.

21. A mass measuring apparatus, comprising:
support means for supporting a mass to be measured;
input frequency means for introducing a frequency input signal to said mass and said support means;
output frequency means operatively connected to said support means for producing an output frequency signal having an amplitude that is a function of said mass; and
measuring means operatively connected to said output frequency means for measuring said amplitude of said output frequency signal.

22. The mass measuring apparatus of claim 21, further comprising:
rectifying means electrically connected to said measuring means for rectifying said output frequency signal.

* * * * *

UNITED STATES PATENT AND TRADEMARK OFFICE
CERTIFICATE OF CORRECTION

PATENT NO. : 4,050,530
DATED : September 27, 1977
INVENTOR(S) : Anthony Storace

It is certified that error appears in the above-identified patent and that said Letters Patent are hereby corrected as shown below:

Claim 6, line 2, change "steps" to -- step --.

Claim 11, line 7, change "c." to -- C. --.

Signed and Sealed this

Fourth Day of April 1978

[SEAL]

Attest:

RUTH C. MASON
Attesting Officer

LUTRELLE F. PARKER
Acting Commissioner of Patents and Trademarks